(12) United States Patent
Huang (10) Patent No.: US 7,861,998 B2
(45) Date of Patent: Jan. 4, 2011

(54) ADJUSTABLE SUPPORTING DEVICE FOR A DISPLAY PANEL

(76) Inventor: Ming-Hsien Huang, 27F.-3, No. 26, Lane 28, Lung-An Rd., Hsi-Chih City, Taipei Hsien (TW)

(*) Notice: Subject to any disclaimer, the term of this patent is extended or adjusted under 35 U.S.C. 154(b) by 166 days.

(21) Appl. No.: 12/329,521

(22) Filed: Dec. 5, 2008

(65) Prior Publication Data
US 2009/0194649 A1 Aug. 6, 2009

(30) Foreign Application Priority Data
Jan. 31, 2008 (TW) .............................. 97202111 U (51) Int. Cl.
*A47F 5/00* (2006.01)
(52) U.S. Cl. ..................................... 248/917; 248/125.1
(58) Field of Classification Search .............. 248/188.1, 248/122.1, 124.1, 125.2, 125.9, 125.7, 131, 248/157, 425, 166, 167, 186.1, 205.1, 207, 248/217.4, 219.2–3, 276.1, 324, 282.1, 284.1
See application file for complete search history.

(56) References Cited

U.S. PATENT DOCUMENTS

2007/0262210 A1* 11/2007 Oh et al. .................. 248/125.1

* cited by examiner

*Primary Examiner*—Terrell Mckinnon
*Assistant Examiner*—Erin Smith
(74) *Attorney, Agent, or Firm*—Frommer Lawrence & Haug LLP; Ronald R. Santucci (57) ABSTRACT

An adjustable supporting device for a display panel includes: a coupling seat connected pivotally to a supporting seat mounted on a supporting surface; a mounting frame coupled to the display panel and connected pivotally to the coupling seat; a torsion spring having a first end engaging the mounting frame, and a second end opposite to the first end and engaging movably the coupling seat, and operable to provide a torsional force for supporting an assembly of the mounting frame and the display panel at a desired orientation relative to the coupling seat; and an adjusting member disposed movably in the coupling seat, abutting against the second end of the torsion spring, and operable so as to adjust the torsional force provided by the torsion spring.

7 Claims, 7 Drawing Sheets

ADJUSTABLE SUPPORTING DEVICE FOR A DISPLAY PANEL

CROSS-REFERENCE TO RELATED APPLICATION

This application claims priority of Taiwanese Application No. 097202111, filed on Jan. 31, 2008, the disclosure of which is incorporated herein by reference.

BACKGROUND OF THE INVENTION

1. Field of the Invention

The invention relates to a supporting device, more particularly to an adjustable supporting device for a display panel.

2. Description of the Related Art

Figure 1:
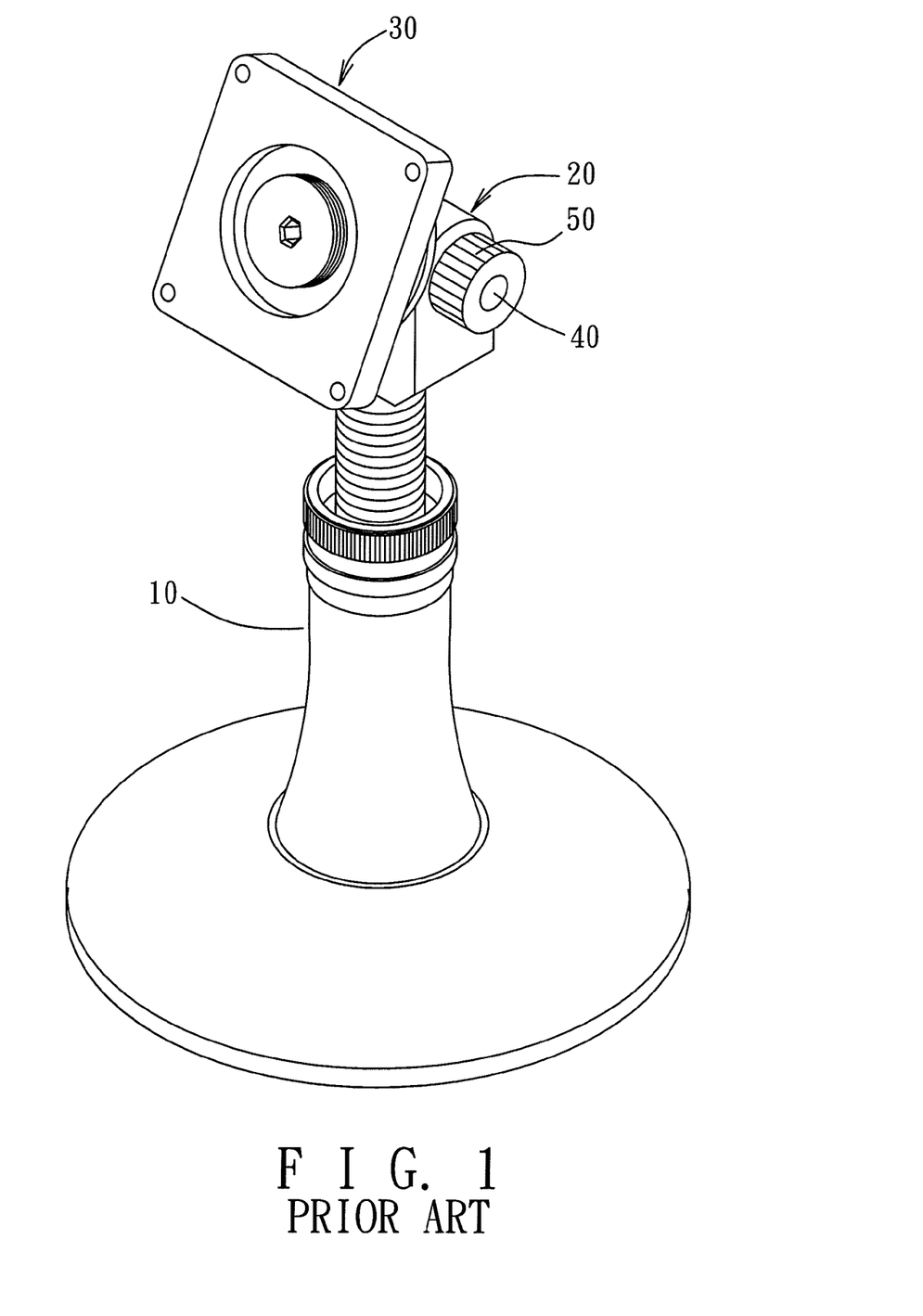
FIG. 1 is a perspective view of a conventional supporting device for a display panel.

FIG. 1 illustrates a conventional supporting device for a display panel (not shown) that includes a supporting base 10, a coupling seat 20 disposed on top of the supporting base 10, and a mounting unit 30 coupled to the display panel and connected pivotally to the coupling seat 20 using a screw bolt 40 that extends through the mounting unit 30 and the coupling seat 20 and engages threadedly a nut 50. Due to frictional engagement between the screw bolt 40 and the coupling seat 20, and between the screw bolt 40 and the mounting unit 30, the mounting unit 30 is maintained at a desired orientation.

However, when the orientation of the mounting unit 30 is adjusted, it is required to act an external force not less than a sum of frictional forces between the screw bolt 40 and the coupling seat 20, and between the screw bolt 40 and the mounting unit 30 on the screw bolt 40 or the nut 50, thereby resulting in inconvenience during operation. Furthermore, the conventional supporting device is not suitable for a display panel having a weight greater than the sum of the frictional forces between the screw bolt 40 and the coupling seat 20, and between the screw bolt 40 and the mounting unit 30.

SUMMARY OF THE INVENTION

Therefore, the object of the present invention is to provide an adjustable supporting device for a display panel which can overcome the aforesaid drawbacks associated with the prior art.

According to the present invention, there is provided an adjustable supporting device adapted for supporting a display panel on a supporting surface. The adjustable supporting device comprises:

a supporting seat adapted to be mounted on the supporting surface;

a coupling seat connected pivotally to the supporting seat so that the coupling seat is rotatable relative to the supporting seat about a first axis;

a mounting frame adapted to be coupled to the display panel and connected pivotally to the coupling seat so that the mounting frame is rotatable relative to the coupling seat about a second axis perpendicular to the first axis;

a torsion spring having a first end engaging the mounting frame, and a second end opposite to the first end and engaging movably the coupling seat, the torsion spring being operable to provide a torsional force adapted for supporting an assembly of the mounting frame and the display panel at a desired orientation relative to the coupling seat; and an adjusting member disposed movably in the coupling seat and abutting against the second end of the torsion spring, the adjusting member being operable so as to adjust the torsional force provided by the torsion spring.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
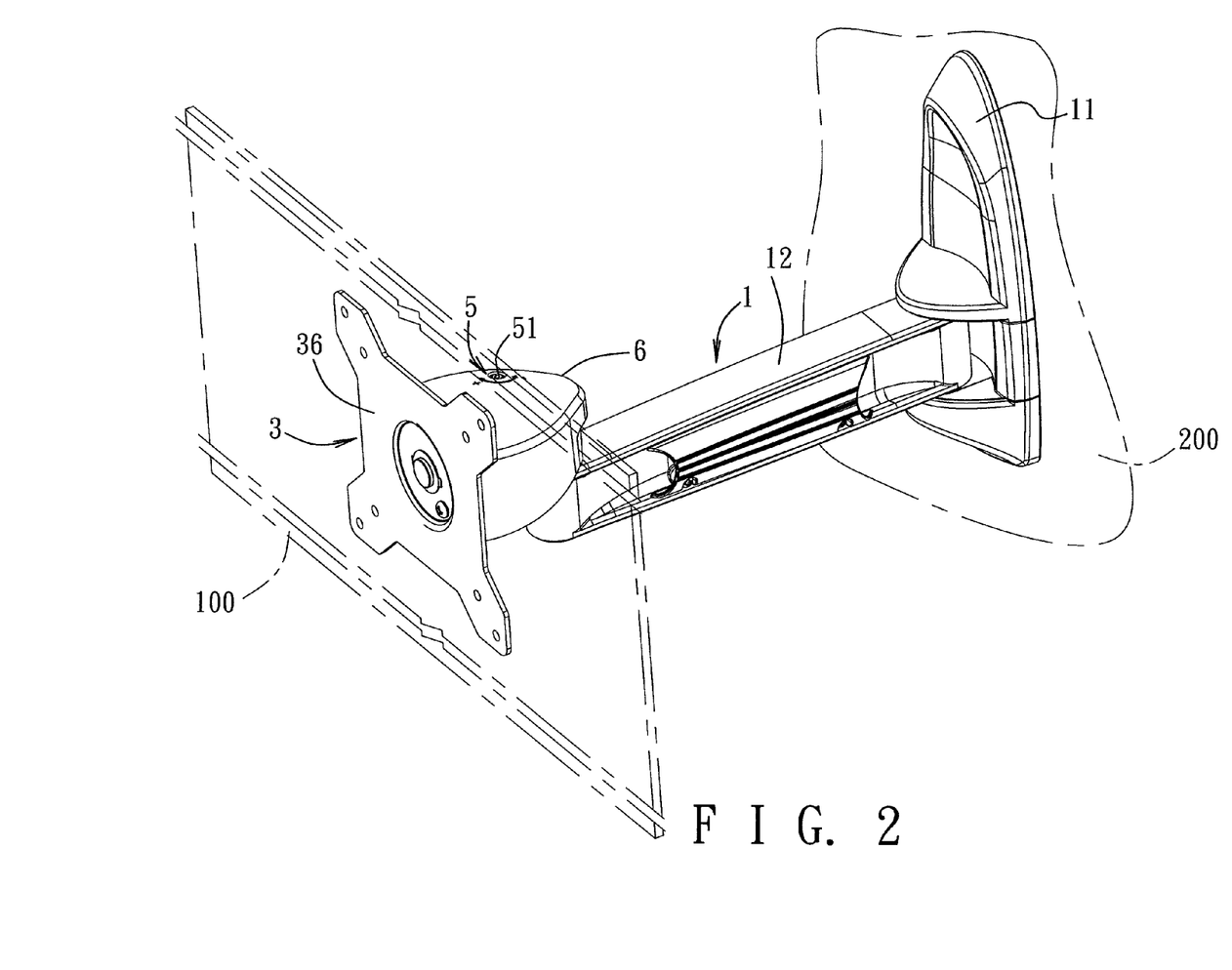
FIG. 2 is a perspective view showing the preferred embodiment of an adjustable supporting device adapted for supporting a display panel on a supporting surface according to the present invention.
Figure 3:
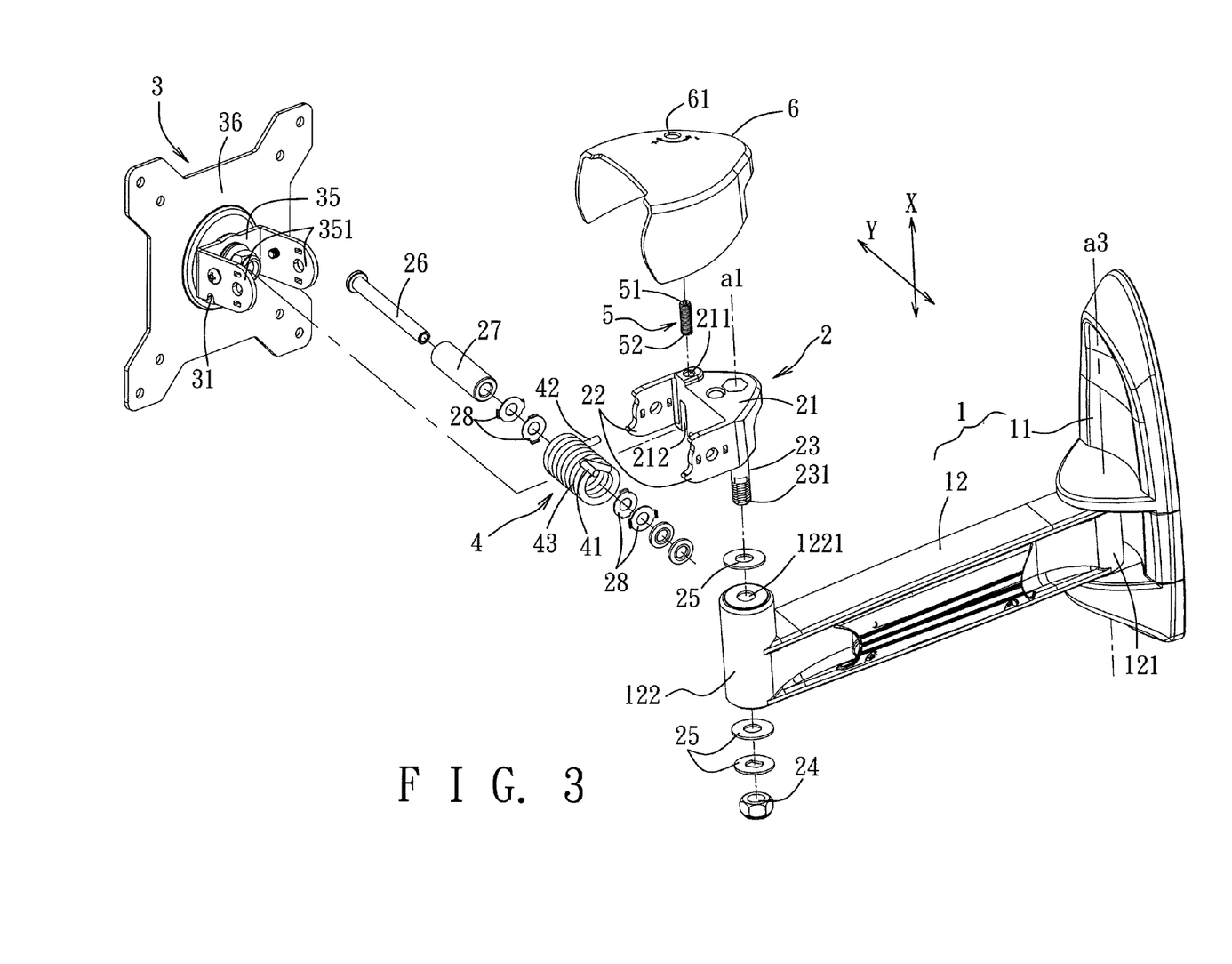
FIG. 3 is a partly exploded perspective view showing the preferred embodiment.

Referring to FIGS. 2 and 3, the preferred embodiment of an adjustable supporting device adapted for supporting a display panel 100 on a supporting surface 200, such as a wall surface, according to the present invention is shown to include a supporting seat 1, a coupling seat 2, a mounting frame 3, a torsion spring 4, and an adjusting member 5.

In this embodiment, the supporting seat 1 includes a base member 11 and an elongate supporting member 12. The base member 11 is adapted to be mounted fixedly on the supporting surface 200 (see FIG. 2). As shown in FIG. 3, the supporting member 12 has a first end portion 121 connected pivotally to the base member 11 so that the supporting member 12 is rotatable relative to the base member 11 about an axis (a3), and a second end portion 122 opposite to the first end portion 121 and formed with a through hole 1221 extending along an axis (a1) parallel to the axis (a3).

Figure 4:
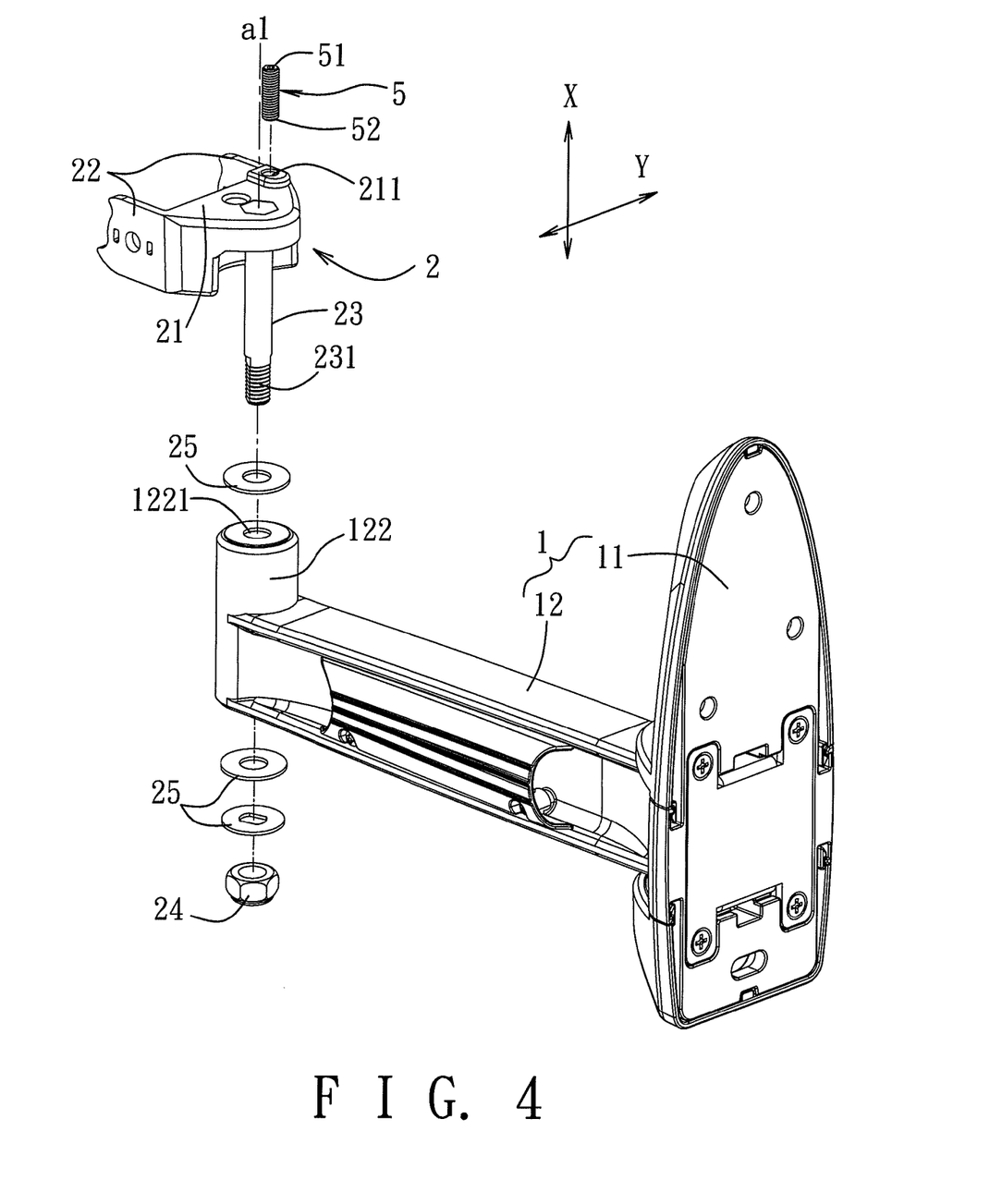
FIG. 4 is a partly exploded perspective view showing a coupling seat, a supporting seat and an adjusting member of the preferred embodiment.

In this embodiment, referring further to FIG. 4, the coupling seat 2 includes a main body 21, a screw rod 23 extending integrally from the main body 21 through the through hole 1221 in the second end portion 122 of the supporting member 12 of the supporting seat 1, and a nut 24 engaging a free end 231 of the screw rod 23 such that the coupling seat 2 is rotatable relative to the supporting member 12 of the supporting seat 1 about the axis (a1). A plurality of washers 25 are sleeved on the screw rod 23 and are disposed between the main body 21 and the second end portion 122 of the supporting member 12 of the supporting seat 1 and between the nut 24 and the second end portion 122 of the supporting member 12 of the supporting seat 1. As shown in FIG. 3, the main body 21 is formed with a threaded hole 211 extending in a first direction (X) parallel to the axes (a1, a3), and a guide slot 212 extending in the first direction (X) and in spatial communication with the threaded hole 211 (see FIG. 6). The coupling seat 2 further includes two pivot plates 22 extending integrally from the main body 21 and opposite to each other in a second direction (Y) perpendicular to the first direction (X).

Figure 5:
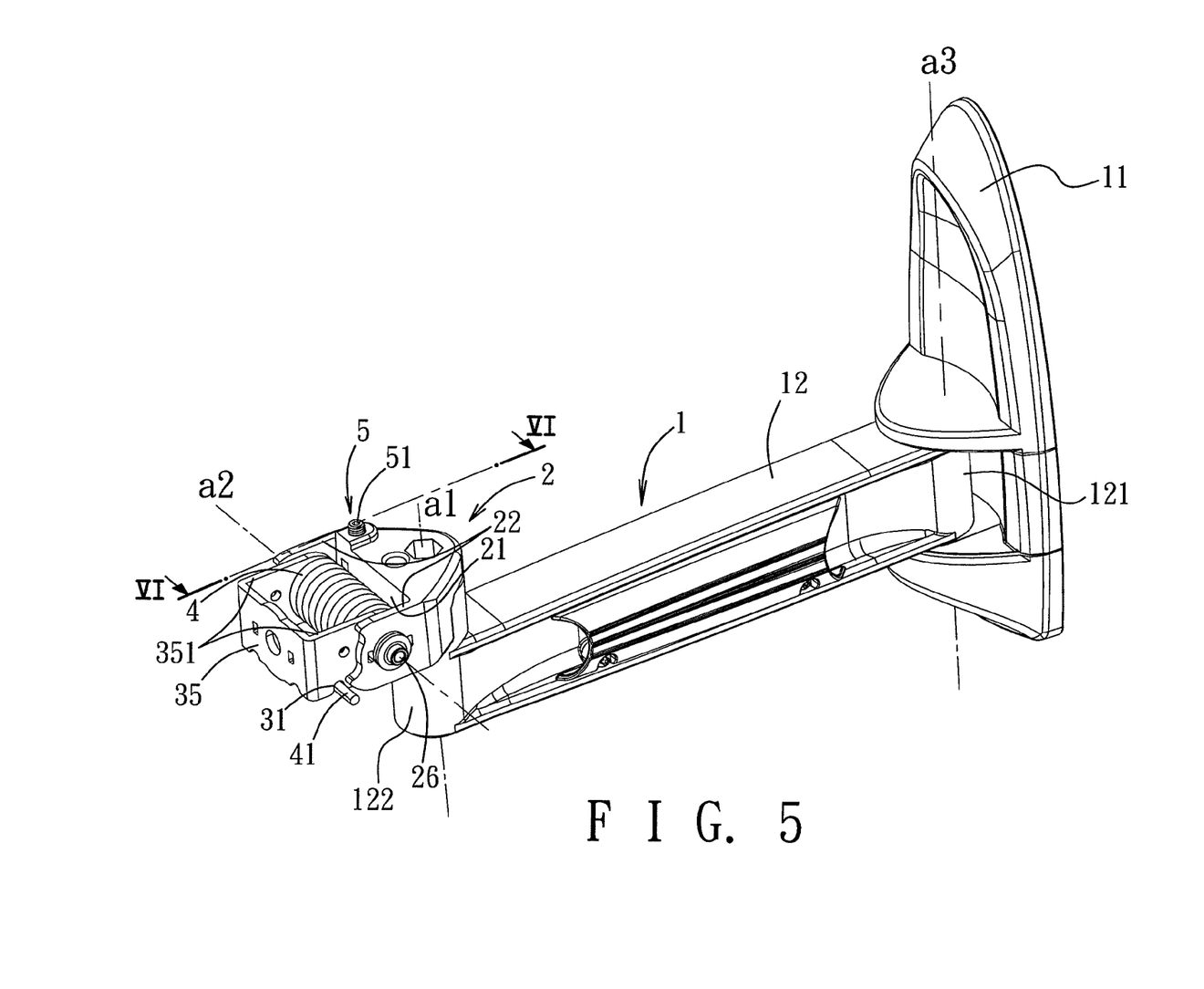
FIG. 5 is an assembled perspective view showing the preferred embodiment without a cover body and a plate body.

In this embodiment, the mounting frame 3 includes a U-shaped frame body 35 and a plate body 36. The plate body 36 is connected to the U-shaped frame body 35, and is adapted to be coupled to the display panel 100 (see FIG. 2. The U-shaped frame body 35 has opposite plate portions 351 disposed between and connected pivotally and respectively to the pivot plates 22 of the coupling seat 2 using a coupling bolt 26 that extends along an axis (a2) perpendicular to the axes (a1, a3) through the pivot plates 22 of the coupling seat 2 and the plate portions 351 of the frame body 35, as shown in FIG. 5, such that the mounting frame 3 is rotatable relative to the coupling seat 2 about the axis (a2). Furthermore, two sets of washers 28 are sleeved on the coupling bolt 26, and are disposed respectively between the pivot plates 22 of the coupling seat 2 and the plate portions 351 of the U-shaped frame body 35. One of the plate portions 351 of the U-shaped frame body 35 is formed with an engaging notch 31.

Figure 6:
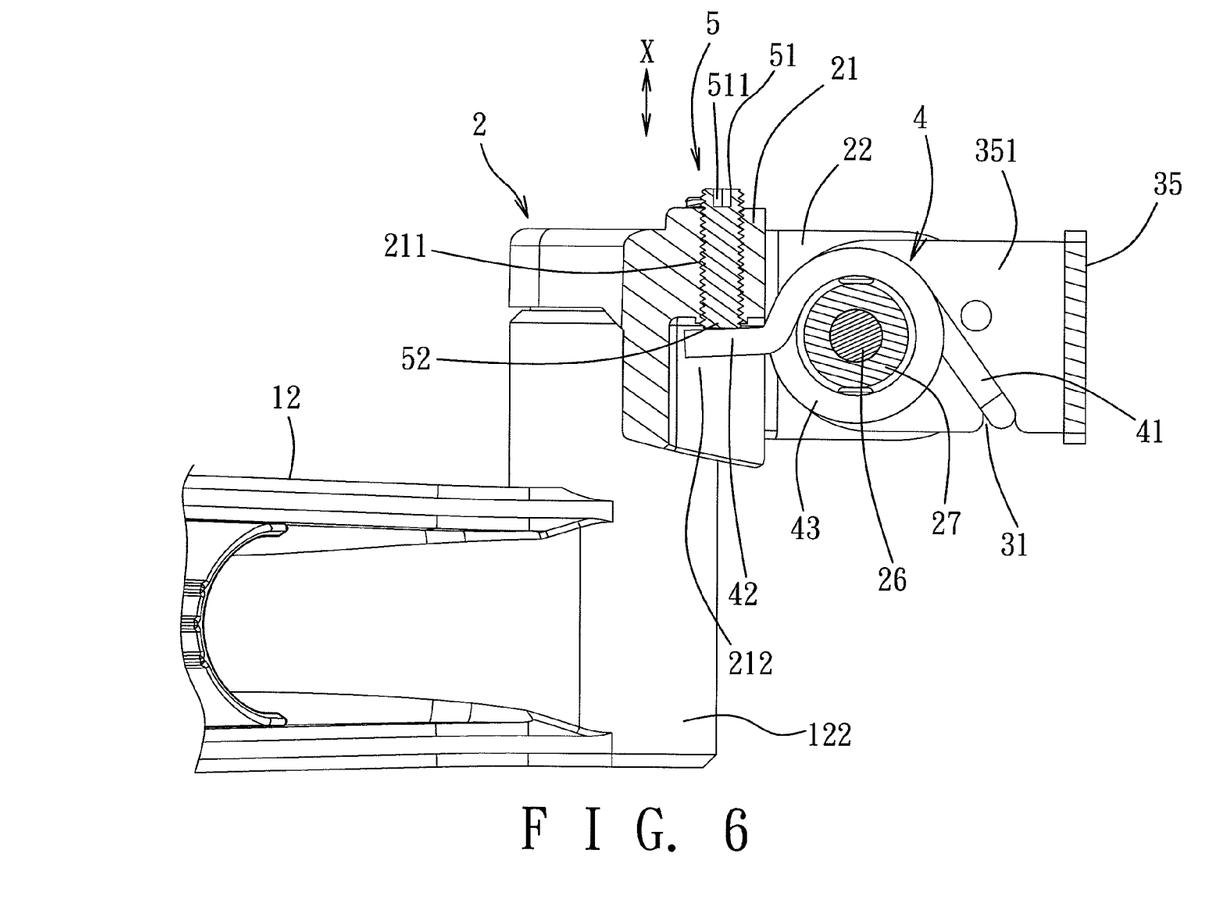
FIG. 6 is a fragmentary, schematic sectional view taken along line VI-VI in FIG. 5 when the adjusting member is in an operated position.

Referring further to FIGS. 5 and 6, in this embodiment, the torsion spring 4 is disposed between the plate portions 351 of the U-shaped frame body 35, and has a first end 41 engaging the engaging notch 31 in said one of the plate portions 351 of the U-shaped frame body 35 of the mounting frame 3, a second end 42 opposite to said first end 41, extending into and movable along the guide slot 212 in the main body 21 of the coupling seat 2 such that the second end 42 engages movably the guide slot 212 in the main body 21 of the coupling seat 2, and an intermediate coiled portion 43 interconnecting the first and second ends 41, 42 and permitting extension of the coupling bolt 26 therethrough. It is noted that the coupling seat 2 further includes a sleeve 27 sleeved on the coupling bolt 26 and disposed fittingly between the intermediate coiled portion 43 of the torsion spring 4 and the coupling bolt 26, as shown in FIG. 6. The torsion spring 4 is operable to provide a torsional force adapted for supporting an assembly of the mounting frame 3 and the display panel 100 at a desired orientation relative to the coupling seat 2.

Figure 7:
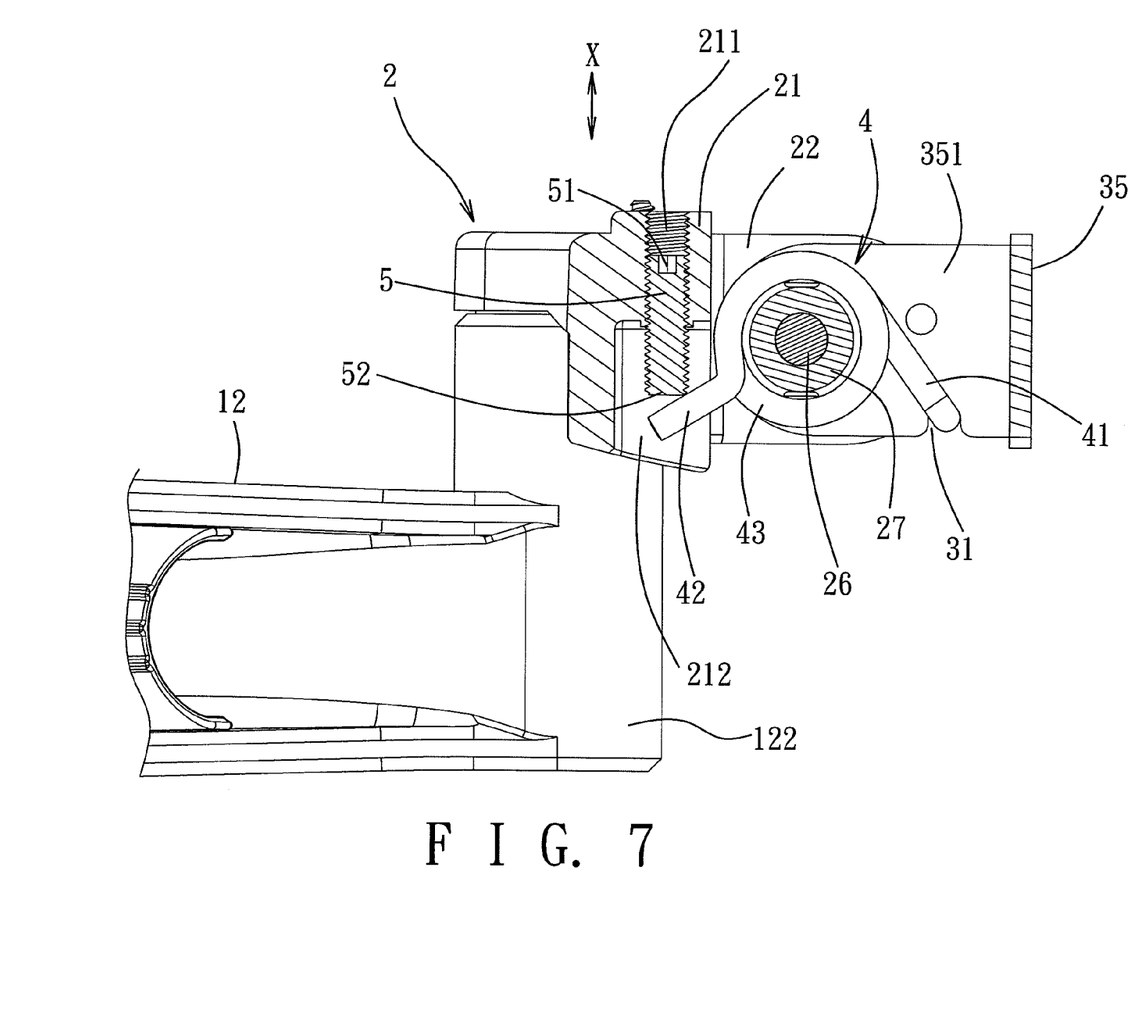
FIG. 7 is a fragmentary, schematic sectional view showing the preferred embodiment when the adjusting member is adjusted to another operated position.

The adjusting member 5 is disposed movably in the coupling seat 2, abuts against the second end 42 of the torsion spring 4, and is operable so as to adjust the torsional force provided by the torsion spring 4. In this embodiment, the adjusting member 5 is configured as a threaded rod, engages threadedly and movably the threaded hole 211 in the main body 21 of the coupling seat 2, and has an operating end 51 exposed from the threaded hole 211 in the main body 21 of the coupling seat 2 and formed with a recess 511 (see FIG. 6) adapted for engaging a driving tool (not shown) during adjustment of the adjusting member 5, and an abutting end 52 opposite to the operating end 51 in the first direction (X) and extending into the guide slot 212 in the main body 21 of the coupling seat 2 such that the abutting end 52 of the adjusting member 5 abuts against the second end 42 of the torsion spring 4. The adjusting member 5 is operable so as to move relative to the main body 21 of the coupling seat 2 in the first direction (X), thereby adjusting the torsional force provided by the torsion spring 4. For example, as shown in FIG. 7, the adjusting member 5 is adjusted to move downwardly so as to increase the torsional force provided by the torsion spring 4. In this case, the adjustable supporting device is suitable for supporting the display panel 100 having a greater weight.

As shown in FIGS. 2 and 3, the adjustable supporting device further includes a cover body 6 for covering the coupling seat 2. The cover body 6 is formed with a through hole 61 corresponding to the threaded hole 211 in the main body 21 of the coupling seat 2 and permitting extension of the driving tool therethrough.

In sum, the torsional force provided by the torsion spring 4 can be adjusted through adjustment of the adjusting member 5 according to the weight of the display panel 100 such that an equilibrium state between the torsional force provided by the torsion spring 4 and the combined weight of the display panel 100 and the mounting frame 3 is achieved so as to maintain the mounting frame 3 at the desired orientation relative to the coupling seat 2. Therefore, the adjustable supporting device of the present invention is suitable for display panels 100 having different weights, and can be easily adjusted to maintain the mounting frame 3 at the desired orientation.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An adjustable supporting device adapted for supporting a display panel on a supporting surface, said supporting device comprising:
    a supporting seat adapted to be mounted on the supporting surface;
    a coupling seat connected pivotally to said coupling seat is rotatable relative to said supporting seat about a first axis;
    a mounting frame adapted to be coupled to the display panel and connected pivotally to said coupling seat so that said mounting frame is rotatable relative to said coupling seat about a second axis perpendicular to the first axis;
    a torsion spring having a first end engaging said mounting frame, and a second end opposite to said first end and engaging movably said coupling seat, said torsion spring being operable to provide a torsional force adapted for supporting an assembly of said mounting frame and the display panel at a desired orientation relative to said coupling seat; and
    an adjusting member disposed movably in said coupling seat and abutting against said second end of said torsion spring, said adjusting member being operable so as to adjust the torsional force provided by said torsion spring, wherein:
    said supporting seat includes a base member adapted to be mounted on the supporting surface, and a supporting member having a first end portion connected pivotally to said base member so that said supporting member is rotatable relative to said base member about a third axis parallel to the first axis, and a second end portion opposite to said first end portion; and
    said coupling seat is connected pivotally to said second end portion of said supporting member of said supporting seat.

2. The adjustable supporting device as claimed in claim 1, wherein:
    said second end portion of said supporting member of said supporting seat is formed with a through hole extending along the first axis; and
    said coupling seat includes a main body, a screw rod extending from said main body through said through hole in said second end portion of said supporting member of said supporting seat, and a nut engaging a free end of said screw rod.

3. The adjustable supporting device as claimed in claim 2, wherein:
    said main body of said coupling seat is formed with a threaded hole extending in a first direction parallel to the first axis, and a guide slot extending in the first direction, in spatial communication with said threaded hole and engaging movably said second end of said torsion spring; and said adjusting member is configured as a threaded rod, engages threadedly and movably said threaded hole in said main body of said coupling seat, and has an operating end exposed from said threaded hole in said main body of said coupling seat, and an abutting end opposite to said operating end in the first direction and extending into said guide slot in said main body of said coupling seat such that said abutting end of said adjusting member abuts against said second end of said torsion spring, said adjusting member being operable so as to move relative to said main body of said coupling seat in the first direction, thereby adjusting the torsional force provided by said torsion spring.

4. The adjustable supporting device as claimed in claim 3, wherein:

said coupling seat further includes two pivot plates extending integrally from said main body and opposite to each other in a second direction perpendicular to the first direction; and said mounting frame includes a U-shaped frame body that has opposite plate portions disposed between and connected pivotally and respectively to said pivot plates of said coupling seat, and provided with said torsion spring therebetween, one of said plate portions of said U-shaped frame body being formed with an engaging notch engaging said first end of said torsion spring, and a plate body connected to said U-shaped frame body and adapted to be coupled to the display panel.

5. The adjustable supporting device as claimed in claim 4, wherein said coupling seat further includes a coupling bolt extending along the second axis through said pivot plates of said coupling seat, said plate portions of said U-shaped frame body of said mounting frame and said torsion spring such that said mounting frame is rotatable relative to said coupling seat about the second axis.

6. The adjustable supporting device as claimed in claim 5, wherein said coupling seat further includes a sleeve sleeved on said coupling bolt and disposed fittingly between said coupling bolt and said torsion spring.

7. The adjustable supporting device as claimed in claim 3, further comprising a cover body for covering said coupling seat, said cover body being formed with a through hole corresponding to said threaded hole in said main body of said coupling seat.

\* \* \* \* \*